Patented Mar. 19, 1946

2,396,639

UNITED STATES PATENT OFFICE 2,396,639

PREPARATION OF ETHYL CHLORIDE

Richard Pence Carter, Elsmere, Del., assignor to Hercules Powder Company, Wilmington, Del., a corporation of Delaware No Drawing. Application June 23, 1943, Serial No. 491,973

7 Claims. (Cl. 260—657)

This invention relates to a process for the preparation of ethyl chloride; more particularly, it relates to preparation from ethanol and hydrogen chloride.

Processes for preparing ethyl chloride from ethanol and hydrogen chloride with the aid of a zinc chloride catalyst have long been known. However, such processes have not been satisfactory in efficiency. Batch processes have required inordinately long reaction periods for completion of the reaction. Continuous processes have been unsatisfactory in that reaction of the ethanol has been incomplete, or, under more drastic reaction conditions, considerable loss of ethanol by formation of ethylene has resulted.

In accordance with the present invention, highly efficient conversion of ethanol to ethyl chloride, with substantially complete reaction and negligible loss of ethanol to by-products, is accomplished by bringing ethanol and hydrogen chloride in mutual contact in a bath of aqueous zinc chloride under controlled and correlated conditions of temperature, pressure and zinc chloride concentration. Briefly, the improvements in yield and efficiency of reaction are obtained by reacting the ethanol and hydrogen chloride in aqueous zinc chloride solution at a temperature in the range from 138° C. to 160° C., and at a gage pressure between about 20 pounds and about 50 pounds per square inch, with the zinc chloride at a concentration between about 40% and about 50% by weight of the zinc chloride plus the water in the solution, and with the temperature and pressure correlated to maintain the zinc chloride concentration in the range mentioned.

The reaction can be carried out in a batch procedure, but since the reaction is completed very rapidly under the controlled conditions hereinabove mentioned, continuous operation is most practical and represents the preferred mode of procedure. A very satisfactory procedure comprises introducing ethanol and hydrogen chloride into a bath of aqueous zinc chloride maintained within the pressure, temperature and concentration ranges mentioned while withdrawing water vapor and ethyl chloride vapor therefrom at substantially the rate at which they are formed, any water introduced as such being considered as part of the water vapor formed. In this manner the zinc chloride solution remains substantially constant in composition and in catalytic effectiveness for any desired length of time. The ethyl chloride is readily recovered from the vapors by condensation and separation from water condensed.

The following examples illustrate specific procedures in accordance with this invention. All parts and percentages are by weight unless otherwise specified.

Example 1

A body of aqueous zinc chloride having a concentration of 45% zinc chloride was placed in a jacketed glass-lined autoclave to a depth of about 16 inches and heated to a temperature of 145° C. The temperature was held at 145° C. throughout the operation. Warm 95% (by volume) ethyl alcohol was introduced into the bottom of the zinc chloride solution at a rate of 0.17 part per hour per part of zinc chloride solution. Concurrently substantially anhydrous hydrogen chloride was introduced into the bottom of the zinc chloride solution at a rate of 0.13 part per hour per part of zinc chloride solution. Ethyl chloride vapor and water vapor were drawn from the vapor space above the zinc chloride solution as they were formed. The pressure in the autoclave was maintained at 30 pounds per square inch gage pressure during the operation. Under these conditions the concentration of the zinc chloride solution remained substantially constant at the initial concentration. The evolved vapors were led through a scrubber in which they passed countercurrent to a stream of water at a temperature of 80° C. which removed any hydrogen chloride from the vapors. The scrubber was operated at a pressure of 30 pounds per square inch. The scrubbed vapor was then cooled to a temperature of 20° C. at a pressure of 30 pounds per square inch under which conditions substantially complete condensation took place. The condensed ethyl chloride was then separated by decantation from the water condensed therewith. The process was operated continuously in this manner to produce ethyl chloride of 99-100% purity. The overall yield of ethyl chloride based on the ethyl alcohol fed to the reactor was 98% of the theoretical. Accounted for losses were 0.4% in the scrubber and 0.9% in the separator in which the condensate was resolved into product and condensed water vapor. Unaccounted for losses were 0.7%.

Example 2

Aqueous zinc chloride solution having a zinc chloride concentration of 47% was placed in a jacketed glass-lined autoclave to a depth of about 16 inches as in Example 1. It was heated to a temperature of 155° C. The temperature was held at 155° C. throughout the operation. Warm 95% (by volume) ethyl alcohol was introduced into the bottom of the zinc chloride solution at a rate of 0.18 part per hour per part of zinc chloride solution. Concurrently substantially anhydrous hydrogen chloride was introduced into the bottom of the zinc chloride solution at a rate of 0.14 part per hour per part of zinc chloride solution. Ethyl chloride vapor and water vapor were drawn from the vapor space above the zinc chloride solution as they were formed. The pressure in the autoclave was maintained at 40 pounds per square inch gage pressure during the operation. Under these conditions the concentration of the zinc chloride solution remained substantially constant at the initial concentration. The evolved vapors were led through a scrubber in which they passed countercurrent to a stream of water at a temperature of 80° C. which removed the hydrogen chloride from the vapors. The scrubber was operated at a pressure of 40 pounds per square inch. The scrubbed vapor was then cooled to a temperature of 20° C. at a pressure of 40 pounds per square inch under which conditions substantially complete condensation took place. The condensed ethyl chloride was then separated by decantation from the water condensed therewith. The process was operated continuously in this manner to produce ethyl chloride of 99% purity. The overall yield of ethyl chloride based on the theoretical obtainable from the ethyl alcohol fed to the reactor was 95%. The accounted for losses in this run were 1.4% in the scrubber and 3.3% in the final separator. The unaccounted for losses were 0.4%.

The examples illustrate operations leading to very high yields of substantially pure ethyl chloride. It has been found that it is essential to maintain the operating conditions carefully within the ranges hereinabove specified to obtain yields of the order obtained in the examples.

The temperature of the zinc chloride is maintained from 138° C. to 160° C. and preferably is held between 140° C. and 150° C. It has been found that higher temperatures cause considerable loss of ethyl alcohol through formation of ethylene. Although it is possible to react ethylene with hydrogen chloride to form ethyl chloride, the reaction is relatively incomplete and hence appreciable formation of ethylene in the reaction greatly decreases the yield of ethyl chloride. It was found, for example, that in operation at 40 pounds per square inch pressure, raising the temperature to 170° C. caused a drop in yield to about 60%. Unaccounted for losses, representing reaction of ethyl alcohol to form ethylene lost as a fixed gas, came to 38-39% under such operation. On the other hand, lowering the temperature to 137° C. when operating with a catalyst concentration of 45% zinc chloride, permitted an appreciable portion of the alcohol fed to pass through the reactor unconverted.

The concentration of the zinc chloride solution is held between about 40% and about 50% by weight and preferably between 43% and 48%. The catalyst concentration as expressed herein and in the claims is the percentage of zinc chloride based on the weight of the zinc chloride plus the water present. Any hydrogen chloride or alcohol which may be dissolved in the solution is omitted from the total weight of the solution in calculating zinc chloride concentration. It has been found that zinc chloride concentrations above about 50% lead to excessive formation of ethylene from the alcohol. Concentrations below above 40% are insufficiently active catalytically and as a result a portion of the alcohol passes through the solution without reacting.

The reaction pressure is held between about 20 pounds per square inch and about 50 pounds per square inch gage pressure (above atmospheric pressure). Preferably, the pressure is held between about 25 pounds and about 40 pounds per square inch. Control of pressure is an important factor in the control of catalyst concentration. Pressures above about 50 pounds per square inch cause the retention of too much water in the catalyst at any of the temperatures in the necessary temperature range and hence cause the catalyst concentration to drop below about 40%. Pressures less than about 20 pounds permit a portion of the alcohol vapor to pass through the catalyst bath without reaction at temperatures low in the critical range and permit too much evaporation of water at the higher temperatures, causing concentration of the catalyst above the limit of about 50%. It is essential to the efficient operation of the process to correlate the pressure with the temperature of operation to maintain the concentration of the zinc chloride solution within the range specified. At any given temperature the pressure must be sufficient to prevent evaporation of water vapor to an extent raising the concentration of the zinc chloride above 50%. At the same time, the pressure must be less than the equilibrium water vapor pressure of the catalyst bath as otherwise the water does not evaporate and the zinc chloride becomes diluted below 40%.

The hydrogen chloride may be in a mol ratio to the ethyl alcohol between about 1.0:1 and about 1.5:1. Preferably, the hydrogen chloride will be in a molal excess of the ethyl alcohol, for example, in a mol ratio between 1.07:1 and 1.12:1.

Since water is produced in the reaction, it is desirable to introduce the reactants in anhydrous or substantially anhydrous form. However, this is not essential. Thus, the ethyl alcohol is conveniently introduced in the usual commercial 95% by volume form. Denatured alcohols may be utilized although it will be appreciated that the denaturing agents will usually find their way into the ethyl chloride product. The alcohol may be vaporized before being introduced into the catalyst solution or it may be introduced into the hot catalyst bath in liquid form. In view of the relatively high temperature of the catalyst bath, the ethyl alcohol may evaporate therein. Similarly, the hydrogen chloride is preferably introduced as the anhydrous or substantially anhydrous gas. However, it may be introduced into the catalyst bath in the form of a concentrated hydrochloric acid.

It will be appreciated that where water is introduced with the reactants it should be kept to a minimum because of the cooling effect on the bath. It may be necessary to increase the depth of the catalyst bath and to provide a source of heat to maintain the catalyst temperature where appreciable water is added. It will also be understood that where water is added in the reactants, the water vapor withdrawn must include not only that formed by the reaction itself but that introduced with the reactants. It will be understood also that where reference is made in operation to withdrawing water vapor at substantially the rate formed, such water vapor will include all the water vapor formed, i. e., that introduced and that chemically formed.

The hydrogen chloride and ethyl alcohol may be premixed before introduction into the catalyst solution or they may be introduced separately. Preferably, the reactants are introduced into the bottom of the catalyst solution. The depth of the catalyst solution will be sufficient to bring about substantially complete reaction of the ethyl alcohol to ethyl chloride at the particular rate at which the reactants are fed. Usually the solution will be in a depth of at least about 15 inches. However, instead of operating with a static bath of catalyst solution, the ethyl alcohol and hydrogen chloride may be passed in the mixed vapor form countercurrent to a stream of zinc chloride catalyst solution, for example, in a packed tower, it being understood that the conditions of temperature, pressure and concentration are maintained in the ranges hereinabove specified.

The ethyl chloride is easily recovered from the reaction product vapors. Since an excess of hydrogen chloride is usually employed it is usually desirable to remove this excess from the vapors. Such removal is readily accomplished by passing the reaction vapors countercurrently to a stream of water at a temperature which is higher than the boiling point of ethyl chloride at the particular pressure at which this scrubbing operation is carried out. In this manner the hydrogen chloride is completely removed with only negligible losses of ethyl chloride. The hydrogen chloride may be recovered from the scrubbing liquor for reuse. The scrubbed ethyl chloride vapor is then readily recovered by cooling it to below its boiling point at the pressure employed, preferably to a temperature well below the boiling point, and then separating the condensed ethyl chloride, as by decantation, from the condensed water vapor associated therewith.

As shown by the examples, the process in accordance with this invention is characterized by substantially complete conversion of the ethyl alcohol fed to ethyl chloride of high purity. The reaction time is only a matter of seconds so that the process is particularly efficient in continuous operation.

What I claim and desire to protect by Letters Patent is:

1. In a process for the preparation of ethyl chloride by reaction of ethanol and hydrogen chloride with the aid of zinc chloride as a catalyst, the improvement which consists in bringing the ethanol and the hydrogen chloride in mutual contact with an aqueous zinc chloride solution having a zinc chloride concentration of between about 40% and about 50% of the weight of the zinc chloride plus the water in the solution, at a temperature in the range from 138° to 160° C., and at a gage pressure between about 20 and about 50 pounds per square inch.

2. A process for the preparation of ethyl chloride which comprises passing hydrogen chloride and ethyl alcohol into a bath of aqueous zinc chloride at a concentration between about 40% and about 50% of the weight of the water plus the zinc chloride in the solution, the temperature of the bath being from 138° C. to 160° C., the pressure over the bath being between about 20 and about 50 pounds per square inch and being correlated with the temperature to maintain the zinc chloride concentration in the said range, and withdrawing ethyl chloride and water vapors from the bath at substantially the rate at which they are formed.

3. A process for the preparation of ethyl chloride which comprises passing hydrogen chloride and ethyl alcohol in a ratio between about 1.0 and about 1.5 mols of hydrogen chloride per mol of alcohol, into a bath of aqueous zinc chloride at a concentration between about 40% and about 50% of the weight of the water plus the zinc chloride in the solution, the temperature of the bath being from 138° C. to 160° C., the gage pressure over the bath being between about 20 and about 50 pounds per square inch and being correlated with the temperature to maintain the zinc chloride concentration in the said range, and withdrawing ethyl chloride and water vapors from the bath at substantially the rate at which they are formed.

4. A process for the preparation of ethyl chloride which comprises passing hydrogen chloride and ethyl alcohol into a bath of aqueous zinc chloride at a concentration between about 40% and about 50% of the weight of the water plus the zinc chloride in the solution, the temperature of the bath being from 138° C. to 160° C., the gage pressure over the bath being between about 20 and about 50 pounds per square inch and being correlated with the temperature to maintain the zinc chloride concentration in the said range, withdrawing ethyl chloride and water vapors from the bath at substantially the rate at which they are formed, and recovering the ethyl chloride from the vapors withdrawn.

5. A process for the preparation of ethyl chloride which comprises passing hydrogen chloride and ethyl alcohol into a bath of aqueous zinc chloride at a concentration between about 43% and about 48% of the weight of the water plus the zinc chloride in the solution, the temperature of the bath being from 140° C. to 150° C., the gage pressure over the bath being between about 25 and about 40 pounds per square inch and being correlated with the temperature to maintain the zinc chloride concentration in the said range, and withdrawing ethyl chloride and water vapors from the bath at substantially the rate at which they are formed.

6. A process for the preparation of ethyl chloride which comprises passing hydrogen chloride and ethyl alcohol in a ratio between about 1.07 and about 1.12 mols hydrogen chloride per mol of alcohol into a bath of aqueous zinc chloride at a concentration between about 43% and about 48% of the weight of the water plus the zinc chloride in the solution, the temperature of the bath being from 140° C. to 150° C., the gage pressure over the bath being between about 25 and about 40 pounds per square inch and being correlated with the temperature to maintain the zinc chloride concentration in the said range, and withdrawing ethyl chloride and water vapors from the bath at substantially the rate at which they are formed.

7. A process for the preparation of ethyl chloride which comprises passing ethyl alcohol and a molal excess of substantially anhydrous hydrogen chloride into a bath of aqueous zinc chloride having a zinc chloride concentration of about 45% by weight of the water plus the zinc chloride in the solution, the temperature of the bath being about 145° C. and the pressure over the bath being maintained at about 30 pounds per square inch gage, withdrawing the ethyl chloride and water vapors from the bath at substantially the rate at which they are formed, scrubbing the vapors with water at a temperature above the boiling point of ethyl chloride to remove excess hydrogen chloride, and condensing the resulting ethyl chloride vapor.

RICHARD PENCE CARTER.